United States Patent

[11] 3,587,641

| [72] | Inventor | Christopher Linley Johnson |
| | | Allestree, Derby, England |
| [21] | Appl. No. | 825,714 |
| [22] | Filed | May 19, 1969 |
| [45] | Patented | June 28, 1971 |
| [73] | Assignee | Rolls-Royce Limited |
| | | Derby, England |
| [32] | Priority | May 27, 1968 |
| [33] | | Great Britain |
| [31] | | 25262/68 |

[54] FLUID METERING DEVICE
10 Claims, 1 Drawing Fig.

[52] U.S. Cl. .................................................. 137/608, 251/344
[51] Int. Cl. .................................................... F16k 31/60, F17d 1/00
[50] Field of Search .................................................. 137/608; 251/341, 343, 344, 345, 347; 138/46

[56] References Cited
UNITED STATES PATENTS

| 535,669 | 3/1895 | Burt | 137/608 |
| 2,106,572 | 1/1938 | Meagher | 137/608 |
| 2,473,620 | 6/1949 | Teague, Jr. | 251/343X |
| 3,277,922 | 10/1966 | Eisel | 251/344X |
| 3,472,486 | 10/1969 | Hastings | 251/345 |
| 3,485,263 | 12/1969 | Laux | 251/344X |

Primary Examiner—Samuel Scott
Attorney—Cushman, Darby and Cushman

ABSTRACT: The invention concerns a fluid metering device comprising a cylindrical member, first and second axially spaced apart tubular members which are disposed concentrically of the cylindrical member and are nested closely with the latter, each of the said cylindrical and tubular members being relatively movable axially with respect to each of the other said members, the cylindrical member being provided with first and second axially spaced apart apertures the cross-sectional area of each of which varies axially, the first and second apertures being respectively adapted to be obturated by the first and second tubular members to an extent dependent upon the relative axial positions of the cylindrical and tubular members, and aperture means through which may pass fluid which has entered, or is to pass out of, the cylindrical member through the first and second apertures, the cylindrical and tubular members being relatively movable axially so as to vary the effective flow area of selected apertures only, and so as to vary the effective flow area of both the first and the second apertures simultaneously.

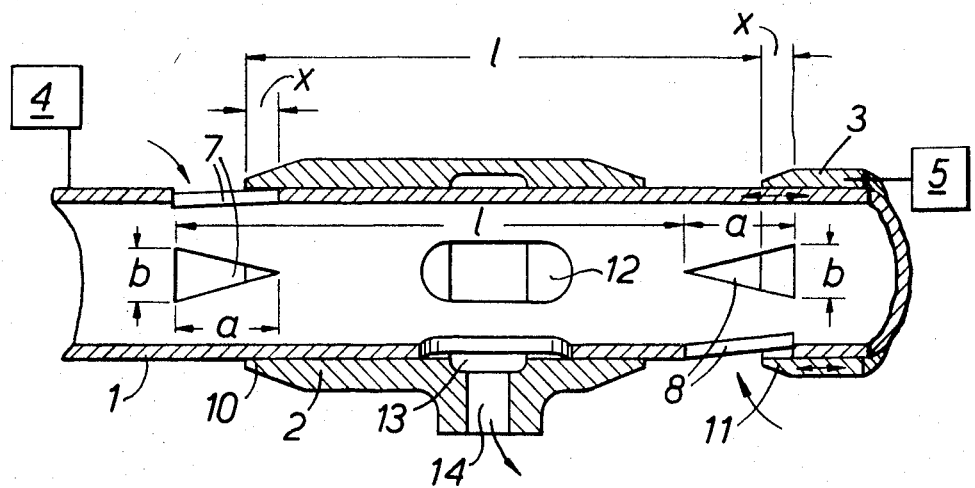

FLUID METERING DEVICE

This invention concerns a fluid metering device, and although the invention is not so restricted, it is more particularly concerned with a fluid metering device for use in a gas turbine engine fuel system.

According to the present invention, there is provided a fluid metering device for a gas turbine engine comprising a cylindrical member, first and second axially spaced apart tubular members which are disposed concentrically of the cylindrical member and are nested closely with the latter, each of the said cylindrical and tubular members being relatively movable axially with respect to each of the other said members, the cylindrical member being provided with first and second axially spaced apart apertures the cross-sectional area of each of which varies axially, the first and second apertures being respectively adapted to be obturated by the first and second tubular members to an extent dependent upon the relative axial positions of the cylindrical and tubular members, openings which are respectively provided in the cylindrical member and the first tubular member and which communicate with each other at all times, and actuating means which are responsive to different engine variables and which effect relative axial movement of the cylindrical and tubular members so as to vary the effective flow area of selected apertures only, and so as to vary the effective flow area of both the first and the second apertures simultaneously.

The cylindrical member is preferably relatively rotatable with respect to the tubular members.

The first tubular member may be axially fixed, both the cylindrical member and the second tubular member being axially movable.

The tubular members are preferably sleeves which are mounted about the cylindrical member, although the tubular members could, if desired, be mounted within the cylindrical member.

If desired, there may be one first aperture and one second aperture only. Preferably, however, there is an angularly spaced apart set of first apertures and an angularly spaced apart set of second apertures.

The cross-sectional area of the first aperture(s) preferably varies axially in the opposite way to that of the second aperture(s).

The first and/or the second apertures may be triangular or may be of trapezoidal or parabolic shape.

The first and second apertures may be of the same size and shape or may differ.

The axial distance between corresponding ends of the first and second apertures is preferably substantially equal to the axial distance between corresponding ends of the first and second tubular members, the said corresponding ends being adapted to obturate the said first and second apertures respectively.

Means may also be provided for varying the pressure fluid drop across the fluid metering device so as to vary the flow through said apertures.

The invention also comprises a gas turbine engine fuel system provided with a fluid metering device as set forth above.

The invention is illustrated, merely by way of example, in the accompanying diagrammatic drawing, which shows a sectional view of a fluid metering device according to the present invention.

Referring to the drawing, a fluid metering device which forms part of a gas turbine engine fuel system (not shown) comprises a rotatably mounted and axially movable cylindrical member 1 which is disposed concentrically within and is nested closely within axially spaced apart sleeves 2, 3, of which the sleeve 2 is fixed both angularly and axially. The sleeve 3, however, is rotatably mounted and is axially movable. Actuators 4, 5 which are respectively responsive to two different variables e.g. to a compressor pressure and to rotational speed respectively) are provided to effect axial movement of the cylindrical member 1 and the sleeve 3 respectively. Thus, each of the members 1, 2, 3 is relatively movable axially with respect to each of the other said members.

The cylindrical member 1 is provided with an angularly spaced apart set of first apertures 7 and also with an angularly spaced apart set of second apertures 8 which are axially spaced from the apertures 7 and are equal in number thereto. Each of the apertures 7, 8 is of the same size and shape and has a cross-sectional area which varies axially, the cross-sectional area of the apertures 7 varying axially in the opposite way to that of the apertures 8. Each of the apertures 7, 8 has the shape of an isosceles triangle having a "base" of length $b$ and a "height" of length $a$.

The apertures 7, 8 are respectively obturated by the adjacent ends 10, 11 of the sleeves 2, 3 to an extent which is dependent upon the relative axial positions of the members 1, 2, 3. As will be seen from the drawing, in the mean position of the parts shown, the ends 10, 11 obturate the apertures 7, 8 throughout a distance of axial length $x$. As also indicated on the drawing, the axial distance $l$ between the ends 10, 11 of the sleeves 2, 3 is equal to (or may be substantially equal to) the axial distance between corresponding ends (e.g. the left-hand ends as seen in the drawing) of the apertures 7, 8.

As will be appreciated, if the sleeve 3 is moved axially, the effective flow area of the apertures 8 will be varied without any variation in the effective flow area of the apertures 7, while if the cylindrical member 1 is moved axially, the effective flow area of both the aperture 7 and the apertures 8 will be varied simultaneously.

Means, not shown, are provided for rotating the cylindrical member 1 so as to diminish the risk of relative sticking between the latter and the sleeves 2, 3.

The cylindrical member 1 is provided with a plurality of angularly spaced apart apertures 12. The sleeve 2 has an annular recess 13 therein which communicates with an outlet aperture 14 and which is at all times in communication with the apertures 12 notwithstanding relative axial movement between the cylindrical member 1 and the sleeve 2. Liquid (or a compressible fluid) may therefore enter the center of the cylindrical member 1 through the apertures 7, 8 and may pass out therefrom through the apertures 12. Thus the settings axially of the cylindrical member 1 and of the sleeve 3 under the control of the actuators 4, 5 will effect metering of this flow of liquid.

Means (not shown), which vary in accordance with a fluid variable, may be provided for varying the pressure drop across the fluid metering device so as to vary the flow through the apertures 7, 8.

In the construction shown in the drawing, in which the apertures 7, 8 are triangular and have an exposed length $a-x$, the exposed area open to fluid flow will be $$N\left\{\tfrac{1}{2}ab - \tfrac{1}{2}\frac{bx^2}{a} + \tfrac{1}{2}(a-x)^2\cdot\frac{b}{a}\right\} = N\cdot b(a-x)$$

where N is the number of apertures in each set thereof.

Thus when the sleeve 3 is moved by a small distance $\Delta x$ from its mean position, the exposed area will be substantially proportional to $(a-x)(1-\Delta x/a)$; that is to say the percentage change is substantially proportional to $\Delta x$ for all values of the exposed area.

Expressing this accurately:

$$\text{Area} = N\left\{\tfrac{1}{2}ab - \tfrac{1}{2}\frac{bx^2}{a} + \tfrac{1}{2}(a-\Delta x)^2\frac{b}{a}\right\}$$

$$= \frac{N}{2}\left\{at - bx^2 + ab + bx^2 - 2bx - 2b\Delta x + \frac{2b}{a}x\Delta x + \frac{b}{a}\Delta x^2\right\}$$

$$= Nb(a-x)\left\{\left(1 - \frac{\Delta x}{a}\right) + \frac{\Delta x^2}{2a(a-x)}\right\}$$

The last term in the square bracket is negligible except where the apertures 7, 8 are nearly shut off.

It will be appreciated that if, in contrast to the present invention, the apertures 8 were rectangular to actual change would be proportional to $\Delta x$.

If desired, instead of the fluid flowing through the apertures 7, 8 and out through the apertures 12, the direction of flow could be reversed. Moreover, the flow could enter the cylindrical member 1 through the apertures 7, 8 and then leave the interior of the cylindrical member 1 through an open and thereof. A further possibility is that the sleeves 2, 3 could be substituted by tubular members mounted concentrically in and closely nested within the cylindrical member 1.

In the drawing the apertures 7, 8 are shown as being triangular, but the shape of apertures which will be used will depend upon the kind of metering which it is desired to effect.

Thus in the case described above, where the exposed area of the apertures 7, 8 is proportional to the relative axial movement so that it is the same as would be obtained with rectangular apertures, the apertures 8 must be triangular. However, the apertures 7 could, if desired, be trapeziums tapering in the opposite direction to the apertures 8, although this would reduce the amount of adjustment possible, and the flow would not be equally shared between the apertures 7, 8. To increase the amount of adjustment the apertures 8 may be longer than the apertures 7.

Similarly, if the area of the apertures 7, 8 which is open to flow is to be proportional to the square of the relative axial movement, then the apertures 8 must be of parabolic shape.

Furthermore if the apertures 7, 8 are to be shut off completely at "zero" travel position of the cylindrical member 1, i.e. when $x = a$, then the apertures 8 must come to a point at the zero flow end.

It is in fact possible to make the total area of flow of the apertures 7, 8 proportional to any monotonically increasing function of the travel.

It will be appreciated that the present invention permits metering of large flows.

I claim:

1. A fluid metering device for a gas turbine engine fuel system comprising: a cylindrical member; first and second axially spaced apart tubular members disposed concentrically of the cylindrical member and nested closely with the same, each of said cylindrical and tubular members being relatively movable axially with respect to each of the other of said members; said cylindrical member being provided with first and second axially spaced apart aperture means, each of said aperture means having a cross-sectional area varying in an axial direction with respect to said cylindrical member, said first and second aperture means being respectively obturated by said first and second tubular members to a extent dependent upon relative axial positions of said cylindrical and tubular members; said cylindrical member and said first tubular member having openings respectively which communicate with each other at all times; a first actuating means responsive to an engine variable to cause relative axial movement of said cylindrical and said tubular members to vary the effective flow area of only one of said first and second aperture means; and a second actuator means responsive to another engine variable to cause relative axial movement of said cylindrical and said tubular members to simultaneously vary the effective flow area of both of said first and second aperture means.

2. A fluid metering devices claimed in claim 1 in which the cylindrical member is relatively rotatable with respect to the tubular members.

3. A fluid metering device as claimed in claim 1 in which the tubular members are sleeves which are mounted about the cylindrical member.

4. A fluid metering device as claimed in claim 1 in which said first aperture means includes an angularly spaced apart set of first apertures and in which said second aperture means includes an angularly spaced apart set of second apertures.

5. A fluid metering device as claimed in claim 1 in which the cross-sectional area of the first aperture means varies axially in the opposite way to that of the second aperture means.

6. A fluid metering device as claimed in claim 1 in which the first and second apertures means are triangular.

7. A fluid metering device as claimed in claim 1 in which the first and second apertures means are of the same size and shape.

8. A fluid metering device as claimed in claim 1 in which the axial distance between corresponding ends of the first and second aperture means is substantially equal to the axial distance between corresponding ends of the first and second tubular members, the said corresponding ends being adapted to obturate the said first and second aperture means respectively.

9. A fluid metering device as claimed in claim 1 in which the first tubular member is axially fixed, both the cylindrical member and the second tubular member being axially movable.

10. A fluid metering device as claimed in claim 9 in which said first actuating means is operatively connected to and axially moves said second tubular member and in which said second actuating means is operatively connected to and axially moves said cylindrical member.